United States Patent [19]
Coates et al.

[11] Patent Number: 5,932,357
[45] Date of Patent: Aug. 3, 1999

[54] PAINTED PLASTICS ARTICLES

[75] Inventors: Robert John Coates, Redditch; Ronald Arthur Easterlow, Coventry; Gordon Frederick Smith, Warwick; Paul David Stidworthy, Coventry, all of United Kingdom

[73] Assignee: Rover Group Limited, Warwick, United Kingdom

[21] Appl. No.: 08/879,375

[22] Filed: Jun. 20, 1997

[30] Foreign Application Priority Data

Jul. 5, 1996 [GB] United Kingdom .................... 9614196
Dec. 2, 1996 [GB] United Kingdom .................... 9625029

[51] Int. Cl.⁶ .............................. B32B 27/06; B32B 27/36
[52] U.S. Cl. .................. 428/483; 427/393.5; 427/412.1; 427/412.3; 427/412.5
[58] Field of Search .............................. 427/393.5, 412.1, 427/412.3, 412.5; 428/483

[56] References Cited

U.S. PATENT DOCUMENTS

| | | |
|---|---|---|
| 3,637,428 | 1/1972 | Aleckner, Jr. . |
| 3,697,311 | 10/1972 | Aleckner, Jr. . |
| 5,114,756 | 5/1992 | Mirabeau et al. ................ 427/413.3 X |
| 5,601,770 | 2/1997 | Maligie ............................ 428/474.4 X |
| 5,629,050 | 5/1997 | Silvis et al. .............................. 427/475 |

FOREIGN PATENT DOCUMENTS

| | | |
|---|---|---|
| 0 595 550 A1 | 5/1994 | European Pat. Off. . |
| 4353414 | 8/1992 | Japan . |
| 520028430 | 7/1993 | Japan . |
| 1 292 882 | 10/1972 | United Kingdom . |
| 2280401 | 9/1993 | United Kingdom . |
| 2 286 795 | 3/1994 | United Kingdom . |
| WO 93/17855 | 9/1993 | WIPO . |

*Primary Examiner*—Michael Lusignan
*Attorney, Agent, or Firm*—Davis and Bujold

[57] ABSTRACT

A painted plastics article in the form of a vehicle wing comprises a polypropylene substrate with a polyamide or polyester coating formed by dual injection or blow moulding. The coating makes the wing suitable for subsequent painting which may be carried out on a normal vehicle paint line used to paint a metal body-in-white. To promote adhesion between the polypropylene substrate and the coating, the substrate includes an admixture of a compatibiliser such as a maleic anhydride grafted polypropylene.

23 Claims, 2 Drawing Sheets

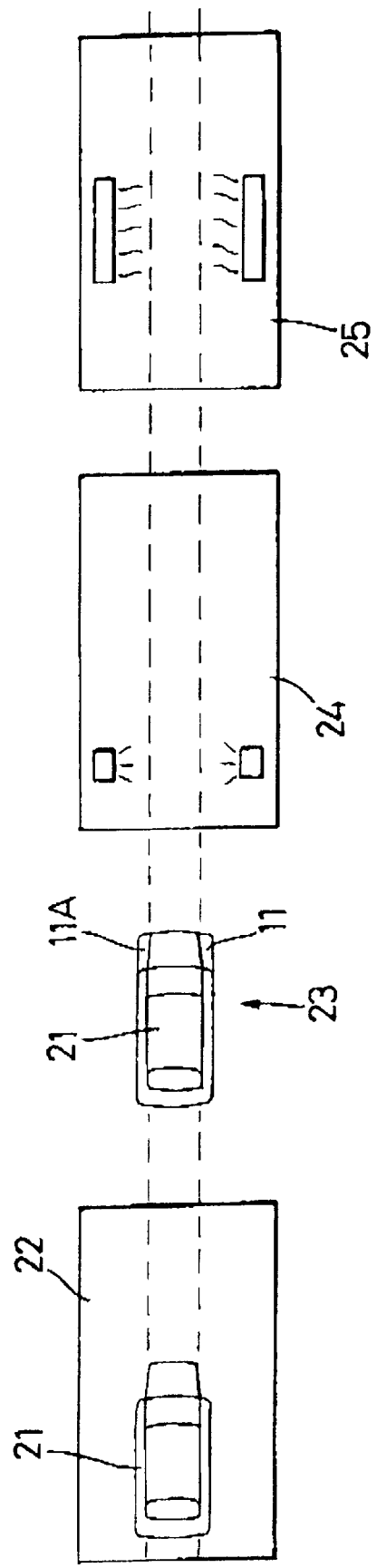

PAINTED PLASTICS ARTICLES

The invention relates to painted plastics articles and their method of manufacture. Complex articles such as motor vehicles frequently use painted plastic parts in place of metal for reasons which include lightness and corrosion resistance. When such a part is made from a material chosen for its mechanical properties, ease of manufacture and cost, this can lead to difficulties when the material has to be painted. The paint is required not only to enhance the appearance of the vehicle but also to help protect the plastic parts from the long term environmental effects such as UV radiation or salt spray. Polyolefins, particularly polypropylene, are particularly suitable for use as vehicle parts because of their mechanical properties and cost-effectiveness. However, such materials are particularly difficult to paint unless the surface to be painted is specially prepared after moulding, e.g. by chemical or plasma etching.

It has been proposed, for example in WO 93/17855 and WO 94/06612, to form a paint layer as part of the moulding process of the plastic part. However, it is sometimes difficult to obtain an exact match between parts made by these methods and the painted finish applied to adjacent metal parts on the same vehicle. Hence it has been contemplated to use methods such as al dual injection or blow moulding as described in WO 94/06612 to form a coating to which a conventional paint readily adheres. This presents several difficulties in that a coating material which in normal use has a high adhesion to the paint layer may have poor adhesion to the substrate. On the other hand, if the coating material is selected or modified to increase the adhesion between the substrate and the coating material then this has been found to reduce the adhesion between the paint and the coating.

The present invention is intended to overcome the above difficulties.

According to a first aspect of the invention there is provided a painted plastics article comprising a substrate made of a first polymeric material and a paint layer made of a paint which in normal use has a low adhesion to the first polymeric material, wherein the article further comprises a coating made of a second polymeric material which is interposed between and is in direct contact with the substrate and the paint layer and which in normal use has a high adhesion to the paint layer, the first polymeric material including a compatibiliser which increases adhesion between the substrate and the coating.

Furthermore, according to a second aspect of the invention there is provided a method of manufacturing a painted plastics article comprising a substrate made of a first polymeric material and a paint layer made of a paint which in normal use has a low adhesion to the first polymeric material, the method comprising forming the substrate and a coating made of a second polymeric material in a mould to form a coated substrate, removing the coated substrate from the mould and applying the paint layer, the method including the steps of selecting the second polymeric material so that in normal use it has a high adhesion to the paint layer and including in the first polymeric material a compatibiliser which increases adhesion between the substrate and the coating.

In accordance with both the first and second aspects of the invention the first polymeric material (the substrate) may comprise a polyolefin, preferably a polypropylene. The second polymeric material (the coating) conveniently comprises a polyamide or a polyester such as PET (Polyethylene Terephthalate) or PBT (Polybutylene Terephthalate). Where the first polymeric material is a polypropylene a preferred compatibiliser comprises a maleic anhydride grafted polypropylene. Where the second polymeric material is a polyester the compatibiliser may also include a random copolymer of ethylene and glycidyl methacrylate, either alone or with a maleic anhydride grafted polypropylene. A polypropylene grafted with acrylic acid may also be suitable.

The paint may comprise a water-borne polyester resin. Such paints are commonly used in the manufacture of motor vehicles but other e.g. solvent based paints, may also be used.

As indicated, the invention is particularly appropriate to the manufacture of motor vehicles and other complex articles which comprise metal parts and plastic parts. Hence according to a third aspect of the invention there is provided a method of manufacturing a complex article comprising a metal part and a plastics part wherein the plastics part is a painted plastics article manufactured by a method according to said second aspect of the invention and at the time that the paint is applied to the coated substrate to form the paint layer the same paint is applied to the metal part.

The invention will now be described by way of example and with reference to the accompanying drawings, in which:

FIG. 3 is a diagrammatic plan view of a vehicle paint line which operates in accordance with the present invention and utilises the wing shown in FIGS. 1 and 2.

FIGS. 1 and 2 show a vehicle wing 11 moulded in two polymeric materials by a dual injection process such as has been described and referred to in WO 93/17855 and WO 94/06612 which are hereby incorporated by reference.

Figure 1:
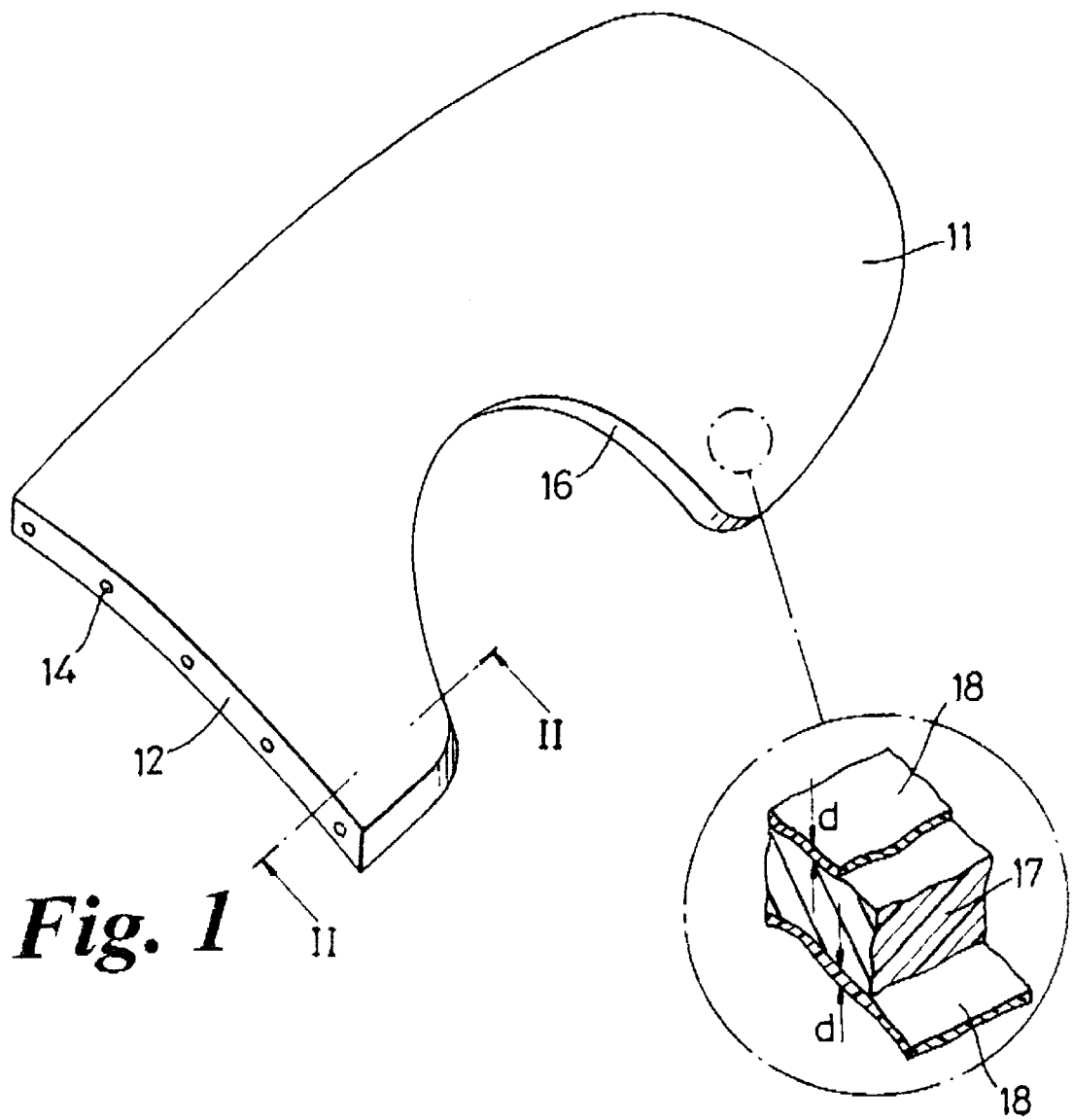
FIG. 1 is a perspective view of a vehicle wing (fender) in accordance with the present invention but prior to painting and including an encircled enlargement of a section of the wing.
Figure 2:
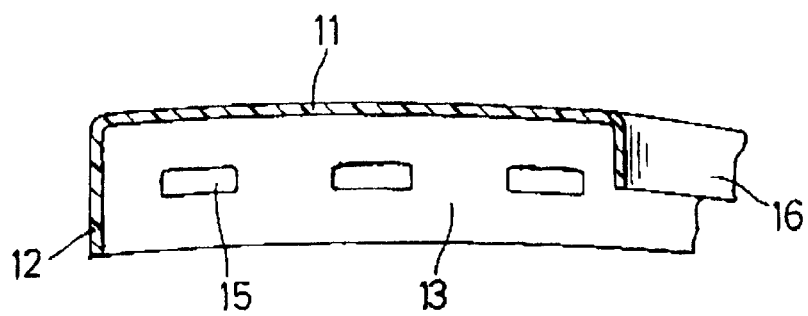
FIG. 2 is a cross-section of part of the wing shown in FIG. 1 on the line II—II.

The wing 11 includes integral fixing flanges 12, 13 which have holes 14, 15 for fasteners which attach the wing to structural members of the vehicle body. Elsewhere there is a stiffening flange 16.

The dual injection process results in a substrate 17 made of a first polymeric material and a coating 18 made of a second polymeric material. The coating has a thickness "d" of about 300 $\mu$m whereas the wing 11 is about 3 to 4 mm thick in total.

The substrate 17 is made of a polypropylene material, DSM Stamylan P, grade 43T1030 although other polypropylenes may be used, for example Montell Hifax SP98E or SP98F. The coating material is a polyamide, DSM Akulon Grade K-222-D. Other polyamides such as DSM Akulon K-223-PM3 may be used. The polypropylene substrate material contains an admixture of a compatibiliser which increases adhesion between the substrate 17 and the coating 18. The compatibiliser is a maleic anhydride grafted polypropylene such as Uniroyal Polybond 3150, Montell Qestron KA-805 EXP or Eastman Epolene G3003. It has been found that polypropylene containing 6 to 15% compatibiliser gives a satisfactory bond between the substrate and the coating. Dupont Fusabond MD108D has also be used but was somewhat less effective in this application. Polypropylene containing 15% Fusabond MD108D gave a reasonably satisfactory bond but 10% was unsatisfactory, Generally, the compatibiliser is of a kind which is commonly used in the manufacture of a thermoplastic alloy or blend containing polypropylene and polyamide polymers. For this reason it is believed that other compatibilisers would be suitable, for example ethylene butylene acrylate grafted with phuumaric acid. This needs to be judged by experimentation, as does the quantity of compatibiliser The quantity of compatibiliser required is suprisingly low because it is believed that the compatibiliser tends to concentrate at the interface of the substrate 17 with the coating 18.

Instead of the polyamide coating material, it is envisaged that a polyester such as PET Polyethylene Terephthalate) or PBT (Polybutylene Terephthalate) may be used. These are likely to obviate a disadvantage of some polyamides whose mechanical properties vary with moisture content. Compatilbilisers suitable for use in the polypropylene substrate when used with a polyester coating material include:

(i) a maleic anhydride grafted polypropylene as mentioned above;

(ii) a random copolymer of ethylene and glycidyl methacrylate, e.g. from the Elf Atochem Lotader range;

(iii) a combination of (i) and (ii);

(iv) a polypropylene grafted with acrylic acid such as Uniroyal Polybond 1001.

As indicated above, the compatibiliser is of a kind which is commonly used in the manufacture of a thermoplastic alloy or blend, in this case one containing polypropylene and polyester polymers.

It will be appreciated that during the dual injection process (or a blow moulding process) the interface of the substrate 17 with the coating 18 is at a high temperature and pressure and it is believed that this helps the bonding of the coating to the substrate.

The exposed external surface of the polyamide or polyester coating 18 is suitable for painting by conventional vehicle paints without the need for further treatment.

FIG. 3 shows an all metal partially assembled vehicle body 21 (i.e. as assembled as a body-in-white) undergoing an electro-chemical priming treatment at station 22. At station 23 the wing 11 and its counterpart 11A on the opposite side of the vehicle are attached and the consequent assembly is sprayed with multiple layers of a conventional polyester based water borne paint in a paint booth 24 followed by curing in a bake oven 25.

The invention is believed to be equally effective with other conventional water-borne paints. Conventional solvent-based paints such as alkyds or melamines can also be used, but have been found to have a slightly reduced adhesion to the coating 18. For this reason, parts which may be painted with solvent-based paints (e.g. spare parts for the motor repair trade) may be painted with a water-based primer paint and supplied as such for subsequent finishing in auto repair shops.

By painting the plastics wings 11 and 11A at the same time as the body-in-white structure 21 an exact paint match is obtained, even with difficult paints such as metallics and pearlescents. It will be appreciated by those skilled in the art of automobile paint finishing that FIG. 3 is a simplification of modern finishing processes and that additional coating/baking processes may be involved For example a surfacer treatment may be applied after the electro-chemical treatment at station 22 and a clearcoat such as an acrylic may be applied after the polyester basecoat is applied in the spray booth 24

As previously stated, polypropylene parts which require painting normally have to be prepared by chemical etching or other methods. In addition to this inconvenience, it is not usually possible to attach such polypropylene parts to the vehicle body until the metal parts have been painted because the heat of the bake oven (such as oven 25) is at a temperature very close to the melt point of polypropylene and such parts will distort disastrously. Hence such conventional parts are painted separately and assembled afterwards. In the example according to the present invention the polyamide or polyester coating 18 provides both thermal insulation and structural support for the polypropylene substrate 17 so that the bake oven 25 does not destroy the wings 11, 11a. In the case of polyamide, this has a melting point of 255° C. and the paint bake oven 25 heats to 140° C. which is below the melting point of the polypropylene (about 160° C.), It will be appreciated that polypropylene is extremely soft at this temperature, indeed polyamide itself starts to become soft at about 160° C. The ability of the polyamide or polyester to withstand the temperature of the bake booth may be enhanced by an appropriate choice of filler materials, e.g. glass fibre, possibly to the extent where the wings 11, 11a are applied before the vehicle body undergoes a surfacer treatment as referred to above, this including a bake of up to 160° C.

Although in the example described the substrate material is polypropylene, it is believed that the invention is equally applicable to other polyolefins such as polyethylene which are equally difficult to paint and that it may be applied when other difficult to paint materials are involved.

Although the example just described refers to a vehicle wing made by a dual injection process, the invention is applicable to any moulding process in which a substrate of a first material receives a coating of a second material. For example, WO 94/06612 referred to above includes for example a blow moulding process which may be used for making box section articles such as sills and spoilers which may also be attached to the vehicle body-in-white before painting as described above.

We claim:

1. A painted plastics article comprising a substrate made of a first polymeric material and a paint layer made of a paint which in normal use has an adhesion to the first polymeric material, wherein the article further comprises a coating made of a second polymeric material which is interposed between and is in direct contact with both the substrate and the paint layer and which in normal use has a greater adhesion to the paint layer than to the substrate, and the first polymeric material including a compatibiliser which increases adhesion between the substrate and the coating.

2. An article according to claim 1 wherein the first polymeric material comprises a polyolefin.

3. An article according to claim 2 wherein the first polymeric material comprises a polypropylene.

4. An article according to claim 1 wherein the second polymeric material comprises a polyamide.

5. An article according to claim 1 wherein the second polymeric material comprises a polyester.

6. An article according to claim 5 wherein the polyester comprises a material selected from Polyethylene Terephthalate (PET) and Polybutylene Terephthalate (PBT).

7. An article according to claim 3 wherein the second polymeric material is selected from a polyamide and a polyester and the compatibiliser comprises a maleic anhydride grafted polypropylene.

8. An article according to claim 3 wherein the second polymeric material comprises a polyester and the compatibiliser comprises a random copolymer of ethylene and glycidyl methacrylate.

9. An article according to claim 3 wherein the second polymeric material comprises a polyester and the compatibiliser comprises a polypropylene grafted with acrylic acid.

10. An article according to claim 1 wherein the second polymeric material is selected from a polyamide and a polyester and the paint comprises a water-borne resin.

11. A method of manufacturing a painted plastics article comprising a substrate made of a first polymeric material and a paint layer made of a paint which in normal use has an adhesion to the first polymeric material, the method comprising the steps of:

forming the substrate and a coating made of a second polymeric material in a mould to form a coated substrate;

removing the coated substrate from the mould and applying the paint layer;

selecting the second polymeric material so that in normal use the second polymeric material has a greater adhesion to the paint layer than to the substrate; and including in the first polymeric material a compatibiliser which increases adhesion between the substrate and the coating.

12. A method according to claim 11 wherein the first polymeric material comprises a polyolefin.

13. A method according to claim 12 wherein the first polymeric material comprises a polypropylene.

14. A method according to claim 11 wherein the second polymeric material comprises a polyamide.

15. A method according to claim 11 wherein the second polymeric material comprises a polyester.

16. A method according to claim 15 wherein the polyester comprises a material selected from Polyethylene Terephthalate (PET) and Polybutylene Terephthalate (PBT).

17. A method according to claim 13 wherein the second polymeric material is selected from a polyamide and a polyester and the compatibiliser comprises a maleic anhydride grafted polypropylene.

18. A method according to claim 13 wherein the second polymeric material comprises a polyester and the compatibiliser comprises a random copolymer of ethylene and glycidyl methacrylate.

19. A method according to claim 13 wherein the second polymeric material comprises a polyester and the compatibiliser comprises a polypropylene grafted with acrylic acid.

20. An article according to claim 11 wherein the second polymeric material is selected from a polyamide and a polyester and the paint comprises a water-borne resin.

21. A method according to claim 11 wherein the painted article is heated to cure the paint.

22. A method of manufacturing a complex article comprising a painted metal part and a plastics part wherein the plastics part is a painted plastic article comprising a substrate made of a first polymeric material and a paint layer made of a paint which in normal use has an adhesion to the first polymeric material, the method comprising the steps of:

forming the substrate and a coating made of a second polymeric material in a mould to form a coated substrate;

removing the coated substrate form the mould and applying the paint layer to the coated substrate while the same paint is applied to the metal part;

selecting the second polymeric material so that in normal use the second polymeric material has a greater adhesion to the paint layer than to the substrate; and including in the first polymeric material a compatibiliser which increases adhesion between the substrate and the coating.

23. A method according to claim 25 wherein the complex article comprises a motor vehicle body.

* * * * *